(12) United States Patent
Nakagawa

(10) Patent No.: US 7,693,487 B2
(45) Date of Patent: Apr. 6, 2010

(54) RADIO COMMUNICATION APPARATUS AND RADIO COMMUNICATION METHOD

(75) Inventor: Atsushi Nakagawa, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1124 days.

(21) Appl. No.: 11/327,388

(22) Filed: Jan. 9, 2006

(65) Prior Publication Data

US 2006/0160552 A1      Jul. 20, 2006

(30) Foreign Application Priority Data

Jan. 20, 2005  (JP)  ............................. 2005-012901

(51) Int. Cl.
*H04B 7/00* (2006.01)
(52) U.S. Cl. .................. 455/41.3; 235/380; 235/492; 235/462; 340/686.1; 340/10.1; 340/505
(58) Field of Classification Search ............. 455/515; 343/741; 340/10.1–10.34; 235/462.01
See application file for complete search history.

(56) References Cited

U.S. PATENT DOCUMENTS

| | | | | |
|---|---|---|---|---|
| 5,553,069 | A | * | 9/1996 | Ueno et al. ............. 370/315 |
| 5,727,230 | A | * | 3/1998 | Fujioka ..................... 710/5 |
| 5,928,325 | A | * | 7/1999 | Shaughnessy et al. ..... 709/206 |
| 5,966,404 | A | * | 10/1999 | Yokota et al. ............. 375/219 |
| 6,641,042 | B1 | | 11/2003 | Pierenkemper et al. |
| 6,676,240 | B2 | * | 1/2004 | Walker ..................... 347/19 |
| 6,938,976 | B2 | * | 9/2005 | Siwinski et al. ........... 347/19 |
| 6,961,540 | B1 | * | 11/2005 | Kondoh .................... 455/41.2 |
| 7,056,048 | B2 | * | 6/2006 | Braun et al. ................ 400/630 |
| 7,187,294 | B2 | * | 3/2007 | Burdette et al. .......... 340/686.1 |
| 2005/0079817 | A1 | * | 4/2005 | Kotola et al. ............. 455/41.2 |
| 2005/0113025 | A1 | * | 5/2005 | Akamatsu et al. ......... 455/41.3 |

FOREIGN PATENT DOCUMENTS

| DE | 298 00 833 U1 | 5/1998 |
|---|---|---|
| JP | 2000-105800 | 4/2000 |
| JP | 2002-216092 | 8/2002 |
| JP | 2005-159915 | 6/2005 |

OTHER PUBLICATIONS

European Search Report dated Jun. 6, 2006 for Appln. No. 05028197.1.

* cited by examiner

*Primary Examiner*—Edward Urban
*Assistant Examiner*—Ganiyu Hanidu
(74) *Attorney, Agent, or Firm*—Pillsbury Winthrop Shaw Pittman, LLP

(57) ABSTRACT

A radio communication apparatus includes a carriage path through which a radio communication medium is carried, a communication antenna provided in the carriage path, and a detector provided on an upstream side of the antenna in a carrying direction of the moving radio communication medium. The detector detects the passing radio communication medium. A radio main unit detects the radio communication medium by using the detector, and transmits a polling command to the radio communication medium at a proper timing on the basis of a detection signal from the detector. Thereby, it is possible to transmit a polling command from the radio main unit to the radio communication medium at a proper timing when the radio communication medium comes to a communication area of the antenna.

3 Claims, 4 Drawing Sheets

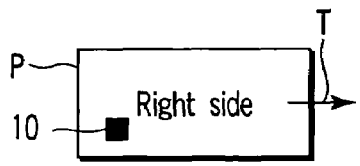
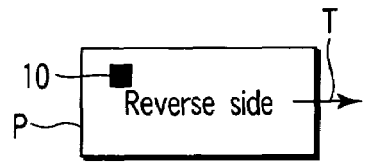
FIG. 6A  FIG. 6B
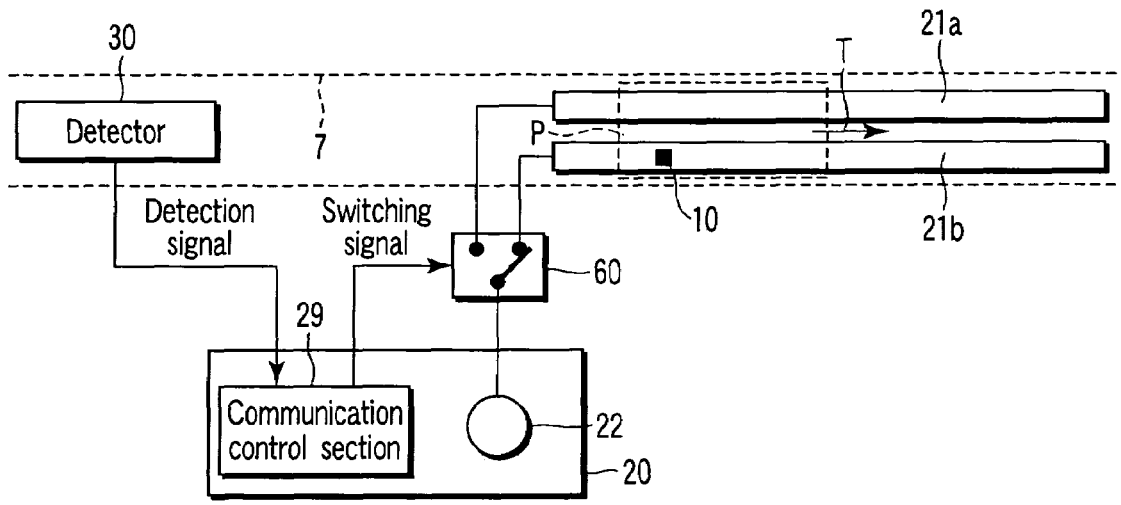
FIG. 7
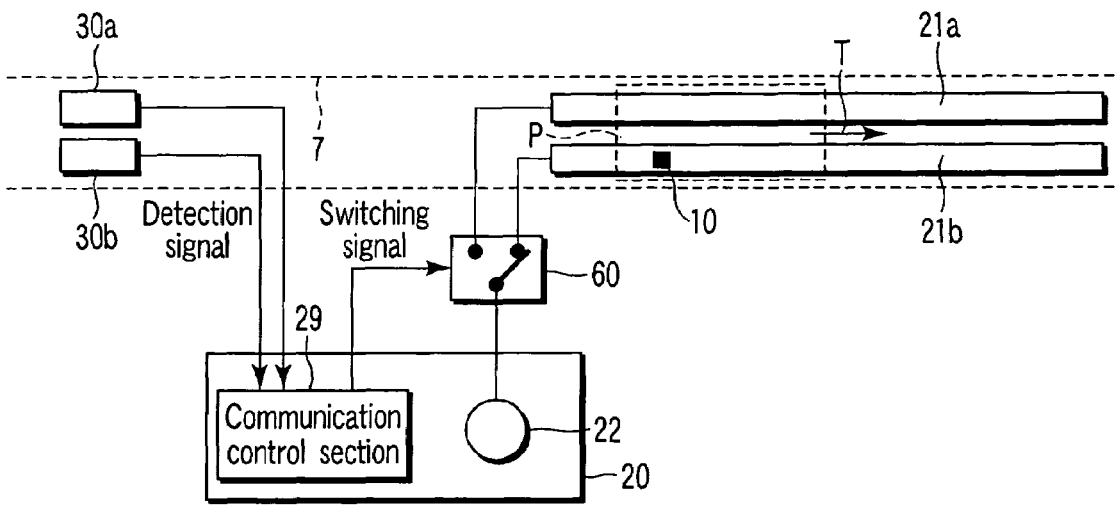
FIG. 8

RADIO COMMUNICATION APPARATUS AND RADIO COMMUNICATION METHOD

CROSS-REFERENCE TO RELATED APPLICATIONS

This application is based upon and claims the benefit of priority from prior Japanese Patent Application No. 2005-012901, filed Jan. 20, 2005, the entire contents of which are incorporated herein by reference.

BACKGROUND OF THE INVENTION

1. Field of the Invention

This invention relates to a radio communication apparatus and a radio communication method, which performs radio communication with a radio communication medium by using electromagnetic waves. In particular, the present invention relates to a radio communication apparatus and a radio communication method, in which sheets of paper such as negotiable securities and mail including a radio communication medium are continuously carried at high speed, and radio communication with the radio communication medium is established by making electromagnetic waves act on the radio communication medium incorporated in paper carried.

2. Description of the Related Art

FIG. 9 schematically illustrates an example of a conventional radio communication apparatus (for example, refer to Jpn. Pat. Appln. KOKAI Pub. No. 2000-105800). This radio communication apparatus has a carriage path 2 through which a radio communication medium 1 is carried in a direction of an arrow shown in FIG. 9. Actually, the radio communication medium 1 is carried in a state of being incorporated in paper (not shown) such as negotiable securities and mail. The term "a state of being incorporated" includes a state of included in paper and a state of being adhered onto a surface of the paper. In the middle of the carriage path 2, there is provided an antenna 4 of a radio main unit 3.

When the radio communication medium 1 carried through the carriage path 2 enters a communication area 5 of the radio main unit 3 (antenna 4), the radio communication medium 1 is supplied with operating electric power by an electromagnetic wave (carrier wave) radiated from the antenna 4. Then, when the supplied power reaches a predetermined level, the radio communication medium 1 changes to a state wherein it can receive a polling command from the radio main unit 3.

As shown in FIG. 10, the radio main unit 3 transmits a polling command at regular intervals through the antenna 4. Actually, the radio main unit 3 transmits a polling command by superposing a polling signal on a carrier wave. Specifically, the radio communication medium 1 which has entered the communication area 5 is supplied with power by a carrier wave, changes into a communicatable state, and performs radio communication with the radio main unit 3 in response to a polling command.

More specifically, the radio communication medium 1 which has entered the communication area 5 and been supplied with power receives a polling command transmitted from the radio main unit 3, and transmits a response to the radio main unit 3 while passing through the communication area 5. When the radio main unit 3 receives the response from the radio communication medium 1, the radio main unit 3 transmits reception data superposed on the received signal to a host apparatus (not shown). The reception data is data of value information if the radio communication medium 1 is incorporated in negotiable securities, and data of address information if it is incorporated in mail. Then, after the communication processing is completed, the radio main unit 3 starts transmission of a polling command again for a next radio communication medium 1 carried.

However, in the conventional radio communication apparatus described above, there are variations in timing at which the radio communication medium 1 carried through the carriage path 2 enters the communication area 5 of the antenna 4 of the radio main unit 3. Therefore, there are cases where the above sequence of communication, in which the radio communication medium 1 enters the communication area 5 of the radio main unit 3, receives a polling command transmitted from the radio main unit 3, and transmits a response, is not completed before the radio communication medium 1 passes through and goes out of the communication area 5.

For example, if the radio communication medium 1 is late in receiving a polling command, there are cases where the radio communication medium 1 cannot transmit a response while it is in the communication area 5 of the radio main unit 3. Such malfunction occurs more frequently as the carrying speed of the radio communication media 1 increases.

Further, for example, if the incorporating position of the radio communication medium 1 in negotiable securities is shifted from the center thereof, positions of the radio communication media 1 when passing through the antenna 4 vary according to the carrying state of the negotiable securities (orientations of the securities, such as whether the front side is up or the back side is up, and whether each security is placed upside down or not). Therefore, if the antenna 4 set in a fixed position with respect to the carriage path 2 is used for radio communication, it cannot provide stable communications to all radio communication media 1 having different carrying states, and communications are sometimes impossible.

BRIEF SUMMARY OF THE INVENTION

The object of the present invention is to provide a radio communication apparatus and a radio communication method, which provide stable communications with radio communication media carried.

To achieve the above object, according to the present invention, there is provided a radio communication apparatus which transmits communication data while supplying an operating power to a moving radio communication medium by making an electromagnetic wave act on the moving radio communication medium, and receives a response signal from the radio communication medium, comprising: an antenna to perform radio communication with the moving radio communication medium; a detector which is provided on an upstream side of the antenna in a moving direction of the moving radio communication medium, and detects the moving radio communication medium; and a radio main unit which transmits a radio communication signal to the radio communication medium when the radio communication medium comes to a setting position of the antenna, based on a medium detection signal obtained from the detector.

According to the present invention, there is further provided a radio communication apparatus which transmits communication data while supplying an operating power to a moving radio communication medium by making an electromagnetic wave act on the moving radio communication medium, and receives a response signal from the radio communication medium, comprising: a plurality of antennas which are arranged side by side in a width direction crossing a moving direction of the moving radio communication medium and perform radio communication with the radio communication medium; a detector which is provided on an upstream side of the antennas in the moving direction of the moving radio communication medium, and detects a passing position of the moving radio communication medium in the width direction; and a selector switch which selects, from the antennas, an antenna set in a position corresponding to the passing position, based on passing position information of the radio communication medium obtained from the detector.

According to the present invention, there is still further provided a radio communication method which transmits communication data while supplying an operating power to a moving radio communication medium by making an electromagnetic wave act on the moving radio communication medium through an antenna, and receives a response signal from the radio communication medium through the antenna, comprising: a medium detecting step of detecting the moving radio communication medium by a detector which is provided on an upstream side of the antenna in a moving direction of the moving radio communication medium, and a signal transmitting step of transmitting a radio communication signal to the radio communication medium when the radio communication medium comes to a setting position of the antenna, based on a medium detection signal obtained from the detector.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIGS. 6A and 6B are diagrams illustrating examples of a carrying state of sheet of paper and a position of a radio communication medium;

FIG. 7 is a schematic diagram illustrating a structure of a main part of a radio communication apparatus according to a third embodiment of the present invention;

FIG. 8 is a schematic diagram for explaining another example of a detector incorporated in the radio communication apparatus of FIG. 7;

DETAILED DESCRIPTION OF THE INVENTION

Embodiments of the present invention are described below with reference to drawings.

First, a first embodiment is described.

Figure 1:
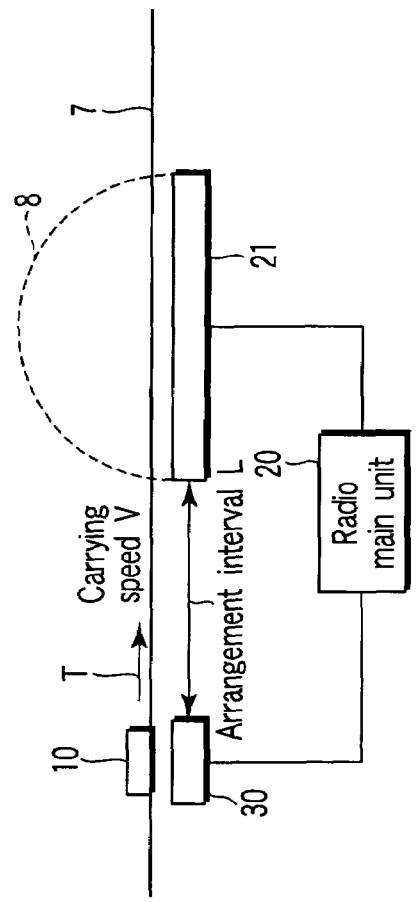
FIG. 1 is a schematic diagram illustrating a radio communication apparatus according to a first embodiment of the present invention.

FIG. 1 is a schematic diagram of a radio communication apparatus according to the first embodiment. In FIG. 1, a radio communication medium 10 is carried at speed v [m/s] in a direction of an arrow T through a carriage path 7. In the first embodiment, the radio communication medium 10 is carried in a state of being mounted on (incorporated into) paper such as negotiable securities and mail (not shown).

In a certain point of the carriage path 7, provided is a communication antenna 21 of a radio main unit 20. Further, a detector 30 that detects the carried radio communication medium 10 is provided on a front side (upstream side of the carrying direction) of the antenna 21 of the carriage path 7 with a predetermined distance L (arrangement interval L) from the antenna 21. An output end of the detector 30 is connected to the radio main unit 20.

In the first embodiment, the radio communication medium 10 is carried in the state of being incorporated into paper, and thus it is necessary to provide a scheme to detect the radio communication medium 10 by the detector 30. Specifically, the first embodiment has a structure wherein a camera which takes an image of a surface of paper carried is used as the detector 30, the type and the carrying attitude of the paper is determined by comparing the taken image with a prepared dictionary image, and the incorporation position of the radio communication medium 10 is determined on the basis of the determination result. Specifically, the incorporation position of the radio communication medium 10 is fixed according to the type of the paper, and therefore it is possible to detect the actual incorporation position of the radio communication medium 10 by detecting the image of the surface of the paper.

Figure 2:
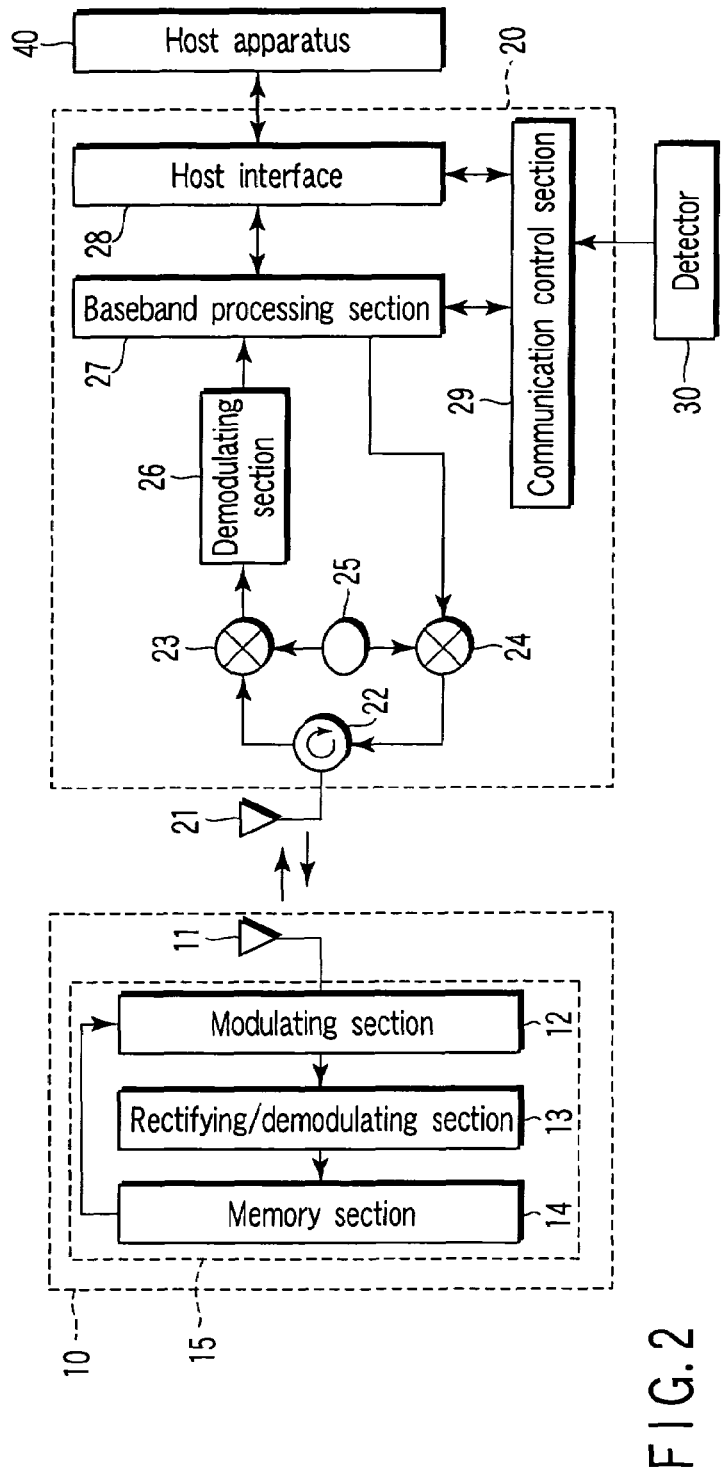
FIG. 2 is a block diagram of the radio communication apparatus of FIG. 1 and a radio communication medium.

FIG. 2 is a block diagram of a system including the radio communication medium 10 and the radio communication apparatus.

First, the radio communication medium 10 is explained.

The radio communication medium 10 comprises a communication antenna 11, a modulating section 12, a rectifying/demodulating section 13, and a memory section 14. The modulating section 12, the rectifying/demodulating section 13, and the memory section 14 are formed as one IC chip 15.

When the carried radio communication medium 10 enters a communication area 8 of the radio communication apparatus, electromagnetic wave (carrier wave) transmitted from the antenna 21 of the radio main unit 20 is received by the antenna 11 of the radio communication medium 10. The electromagnetic wave is rectified by the rectifying/demodulating section 13 and used as operation power of the radio communication medium 10.

The radio communication medium 10 becomes operable by the generated DC power. Then, the radio communication medium 10 receives a polling command (radio communication signal) transmitted from the radio main unit 20 and superposed on a carrier wave, reads preset data from the memory section 14, and transmits the data through the antenna 11. The transmission data is modulated by the modulating section 12.

The modulating section 12 is formed of a diode switch or the like, and switches between an ON state and an OFF state according to the state of the transmission data. For example, if the transmission data is "1", the modulating section 12 is changed to the ON state, and the antenna 11 is terminated by antenna impedance. As a result, the electromagnetic wave from the radio main unit 20 is absorbed. Further, if the transmission data is "0", the modulating section 12 is changed to the OFF state, that is, the diode switch is opened. Then, the end of the antenna 11 is also opened, and consequently the electromagnetic wave from the radio main unit 20 is reflected.

The radio communication medium 10 transmits data to the radio main unit 20 by the backscattering method as described above.

Next, the radio communication apparatus is explained. The radio communication apparatus comprises the radio main unit 20, the antenna 21, and the detector 30.

The radio main unit 20 has a circulator 22, mixers 23 and 24, an oscillator 25, a demodulating section 26, a baseband processing section 27, a host interface section 28, and a communication control section 29. The communication control section 29 is connected to an output end of the detector 30. Further, the radio main unit 20 is connected to a host apparatus 40 with the host interface section 28 interposed therebetween.

When the host apparatus 40, such as a host computer, transmits a read command to the radio main unit 20, the command is transmitted to the communication control section 29 through the host interface section 28, and a read command is issued to the baseband processing section 27.

The baseband processing section 27 edits the transmission data on the basis of the read command and, after filtering, transmits the transmission data as a baseband signal to the mixer 24. The baseband signal is subjected to ASK (Amplitude Shift Keying) modulation in the mixer 24. The ASK-modulated signal is superposed on a carrier wave radiated from the antenna 21 via the circulator 22, and thereby transmitted to the radio communication medium 10.

The transmitted electromagnetic wave is reflected by the radio communication medium 10 by the backscattering method as described above. The signal reflected by the radio communication medium 10 is received by the antenna 21, and input to the mixer 23, to which the same local frequency as that in transmission thereof is input. The mixer 23 extracts the signal modulated by the radio communication medium 10.

The demodulating section 26 demodulates the signal extracted in the mixer 23 to data "1" or "0", and transmits the data to the baseband processing section 27. The data extracted in the baseband processing section 27 is transmitted to the host apparatus 40 through the host interface section 28.

As described above, the radio communication apparatus can read data stored in the memory section 14 of the radio communication medium 10 in a noncontact manner.

Next, operation of the above radio communication apparatus is explained.

Figure 10:
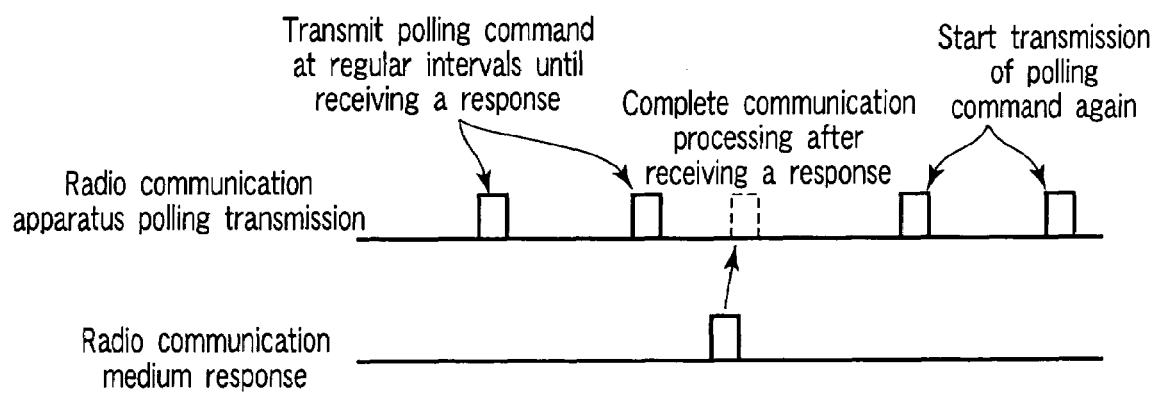
FIG. 10 is a timing chart for explaining a transmission timing of a polling command by the conventional radio communication apparatus of FIG. 9.

As described above, the conventional radio communication apparatus transmits a polling command at regular intervals as shown in FIG. 10, to communicate with radio communication media which enter the communication area at irregular intervals. However, according to this method, if sheets of paper, in each of which a radio communication medium is attached or incorporated, are continuously carried at relatively high speed, there are cases where communication processing is not completed while the radio communication medium exists in the communication area of the radio communication apparatus.

Figure 3:
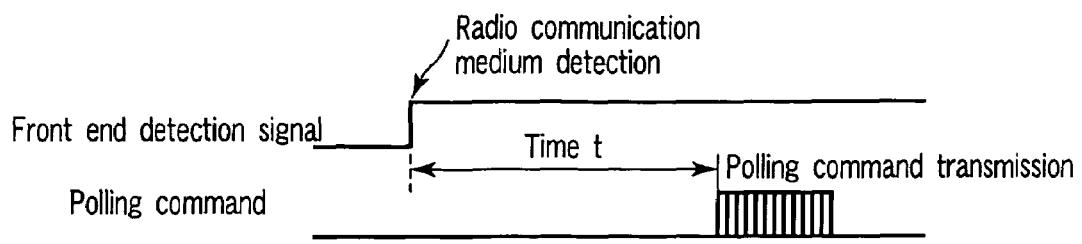
FIG. 3 is a timing chart for explaining operation of the radio communication apparatus of FIG. 1.

Therefore, in the first embodiment, the detector 30 shown in FIG. 1 detects the position of the radio communication medium 10, and a polling command is transmitted to each radio communication medium 10 at proper timing. Specifically, the detector 30 detects the actual carrying position of the radio communication medium 10. Then, as shown in FIG. 3, after the front edge portion of the radio communication medium 10 in the carrying direction has passed a specific position, the communication control section 29 counts a time t predetermined in accordance with the carrying speed in the carriage path 7, and outputs, after the time t has passed, a command signal for transmitting a polling command. In this operation, the timing of transmitting a polling command, that is, the time t, is set to such a timing that the radio communication medium 10 receives a polling command after the radio communication medium 10 comes into a state of receiving a polling command by power supply.

As described above, according to the first embodiment, the radio communication medium 10 itself incorporated in paper is detected by the detector 30, and a polling command is transmitted at a timing when the radio communication medium 10 reaches the communication area 8 and communication with it becomes possible. Therefore, it is possible to complete radio communication while the radio communication medium 10 exists in the communication area 8, and perform a stable communication processing with the radio communication medium which is carried at relatively high speed.

Next, a second embodiment of the present invention is explained. In the second embodiment, instead of a camera, a reflection optical sensor having a light source and a photoreceptor is used as a detector 30 being more reasonable than that in the first embodiment. The structure of the second embodiment is the same as the first embodiment except the detector 30. Therefore, constituent elements having the same respective functions as in the first embodiment are denoted by the same respective reference numerals as in the first embodiment, and detailed explanation thereof is omitted.

If a radio communication medium 10 is incorporated into paper such as negotiable securities, the incorporation positions differ according to the type of the paper. Further, the carrying positions of the radio communication medium 10 differ even between sheets of paper of the same type, according to the carrying attitude thereof. For example, as shown in FIG. 4, there are an carrying attitude of pattern A in which the radio communication medium 10 is located in a position close to a front end side of the carrying direction, and a carrying attitude of pattern B in which the radio communication medium 10 is located in a position close to a rear end side of the carrying direction.

Therefore, if a polling command is transmitted at a timing when a predetermined time has passed after the optical sensor detects the front end of the paper P in the carrying direction, there are cases where the radio communication apparatus transmits a polling command to the radio communication medium 10 before the internal power supply voltage is applied in the radio communication medium 10, depending on the carrying attitude of the paper P. In this case, the radio communication medium 10 cannot normally receive the polling command.

Figure 4:
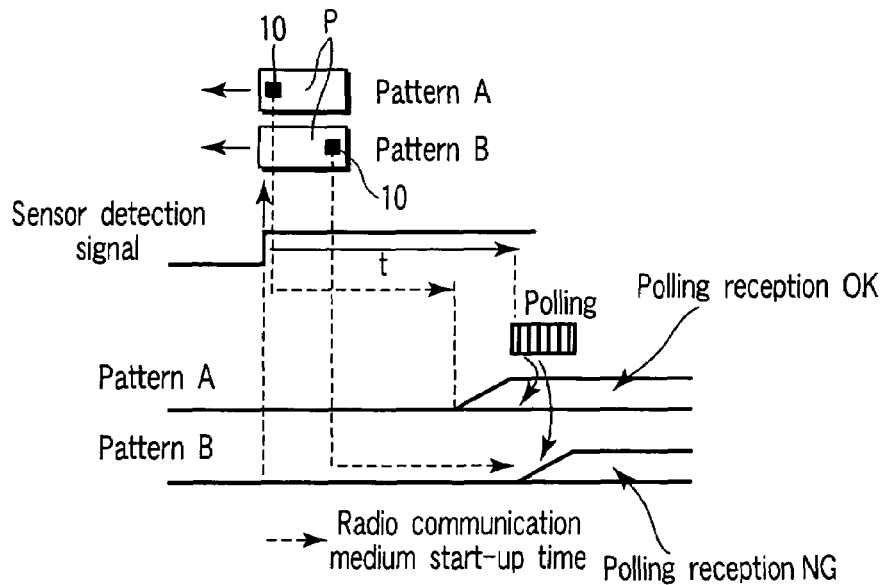
FIG. 4 is a timing chart for explaining operation of a radio communication apparatus according to a second embodiment of the present invention.

Specifically, the paper P of the pattern A shown in FIG. 4 is carried in the attitude where the radio communication medium 10 is located in a position close to the front end side of the carrying direction, and thus normal communication processing is possible even if a polling command is transmitted at the timing described above. However, in the case of the pattern B, if a polling command is transmitted at the above timing, a polling command is transmitted when power supply to the radio communication medium 10 is insufficient, and communication processing is not normally performed.

Figure 5:
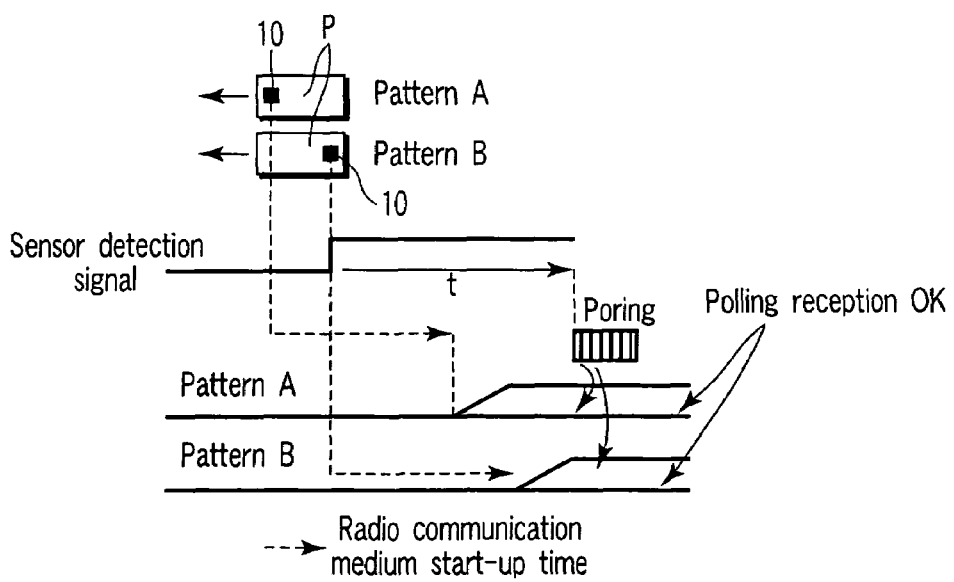
FIG. 5 is a timing chart for explaining operation of the radio communication apparatus according to the second embodiment of the present invention.
Figure 9:
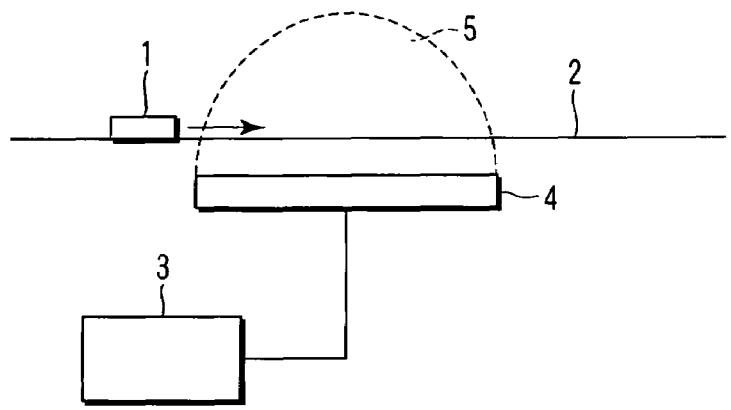
FIG. 9 is a schematic diagram illustrating a conventional radio communication apparatus.

Therefore, in the second embodiment, a polling command is transmitted when the time t has passed after the detector 30 detects the rear end of the carried paper P in the carrying direction, that is, after the whole paper P has passed the above specific position as shown in FIG. 5, instead of transmitting a polling command when the time t has passed after the detector 30 detects the front end of the carried paper P. Thereby, a polling command is transmitted to the paper P after start-up of the radio communication medium 10, regardless of the carrying attitude and the type of the paper P.

As described above, also according to the second embodiment, a polling command can be transmitted at a proper timing as in the first embodiment according to the carrying position of the radio communication medium 10, and stable communication processing is possible even with the communication medium 10 carried at relatively high speed.

Next, a third embodiment of the present invention is explained. As shown in FIG. 7, a radio communication apparatus of the third embodiment is characterized by having two antennas 21*a* and 21*b*, which are arranged side by side in a direction crossing the carrying direction of the radio communication medium 10 (hereinafter referred to as "width direction"). That is, antennas of a required number are arranged side by side in the width direction. A combination of this structure with the above second embodiment enables stable communication processing, regardless of the incorporating position of the radio communication medium 10 in the paper P. The third embodiment is almost the same as the first embodiment except that the third embodiment includes a plurality of antenna 21*a* and 21*b*. Therefore, constituent elements having the same respective functions as in the first embodiment are denoted by the same respective reference numerals as in the first embodiment, and detailed explanation thereof is omitted.

For example, if the radio communication medium 10 is incorporated in a position close to a corner portion of a rectangular sheet of paper P, the passing position of the radio communication medium 10 in the width direction varies according to the carrying attitude (the orientation of the medium, such as whether it is carried with right side up or reverse side up, and whether it is carried upside down or not) of the paper P. Specifically, in the paper P which is carried in a direction of arrow T in the carrying attitude as shown in FIG. 6A, the radio communication medium 10 passes through a position close to the bottom side of the drawing. In the paper P which is carried in the direction of arrow T in the carrying attitude as shown in FIG. 6B, the radio communication medium 10 passes through a position close to the top side of the drawing.

Such information concerning the carrying attitude of the paper P and the passing position of the radio communication medium 10 can be obtained by taking an image of the surface of the paper by the detector 30, and comparing the image with a prepared dictionary image. Such an image recognition method using a dictionary image can be achieved in combination with well-known art.

In the third embodiment, the antennas 21*a* and 21*b* are arranged in respective positions corresponding to two positions in the width direction through which the radio communication medium 10 passes. The antennas 21*a* and 21*b* are connected to a circulator 22 through a selector switch 60. A communication control section 29 controls the selector switch 60 on the basis of carrying position information of the radio communication medium 10 detected by the detector 30.

For example, if the detector 30 detects that the paper P is in the carrying attitude shown in FIG. 6A, the communication control section 29 controls the selector switch 60 to select the antenna 21*b* corresponding to the carrying attitude. On the other hand, if the detector 30 detects that the paper P is in the carrying attitude shown in FIG. 6B, the communication control section 29 controls the selector switch 60 to select the antenna 21*a* corresponding to the carrying attitude. Thereby, the radio communication medium 10 passes directly above the active antenna in any cases, regardless of the carrying attitude of the paper P.

Further, FIG. 8 illustrates another example of the detector 30. As shown in FIG. 8, a plurality of (two in this embodiment) metal detectors 30*a* and 30*b* (detecting sections) may be used as the detector. The metal detectors 30*a* and 30*b* are arranged side by side in the width direction. The metal detectors 30*a* and 30*b* detect a terminal of a semiconductor device or a metal portion of the antenna 11 of the radio communication medium 10, and thereby detects presence/absence (passage) of the radio communication medium 10.

The structure in which the metal detectors 30*a* and 30*b* are arranged side by side in the width direction as shown in FIG. 8 enables detection of the passing position (the upper side or the lower side in FIG. 8) of the radio communication medium 10, regardless of the carrying state (it is carried right side up or reverse side up, and upside down or not) of the paper.

Specifically, the communication control section 29 controls the selector switch 60 to select a corresponding antenna, on the basis of a detection result obtained by the metal detectors 30*a* and 30*b*. The position determination and detection of the radio communication medium 10 may be performed by a method other than the above method using image recognition and the method using metal detectors.

As described above, according to the third embodiment, even if sheets of paper P are carried in various carrying attitudes, in which they are carried with the right side up or reverse side up and upside down or not, the incorporating position of the radio communication medium 10 of each paper P carried is detected, and the antennas 21*a* and 21*b* are switched on the basis of the detection result. This achieves a stable communication state, and enables a stable communication processing even with the radio communication medium 10 carried at relatively high speed.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

For example, in the third embodiment, explained is the case where two antennas are arranged side by side in the width direction. However, the present invention is not limited to it, but may adopt a structure in which three or more antennas are provided side by side, and the selector switch of the antennas has contact points of a number corresponding to the number of the antennas.

Further, in the above embodiments, carrier waves on which a polling command is to be superposed are continuously emitted. However, the carrier waves may be turned on and off such that it is transmitted at a timing when the detector 30 detects a radio communication medium.

What is claimed is:

1. A radio communication apparatus which transmits communication data while supplying operating power to a moving radio communication medium by making an electromagnetic wave act on the moving radio communication medium, and receives a response signal from the radio communication medium, the radio communication apparatus comprising:

an antenna to perform radio communication with the moving radio communication medium;

a detector which is provided on an upstream side of the antenna in a moving direction of the moving radio communication medium, and detects the moving radio communication medium; and a radio main unit which transmits a radio communication signal to the radio communication medium when the radio communication medium comes to a setting position of the antenna, based on a medium detection signal obtained from the detector, wherein the radio communication medium is moved in a state of being incorporated into paper, and the detector takes an image of a surface of the paper into which the radio communication medium is incorporated, compares the image with a dictionary image prepared in advance, and detects an incorporation position of the radio communication medium based on a result of the comparison.

2. A radio communication apparatus which transmits communication data while supplying an operating bower to a moving radio communication medium by making an electromagnetic wave act on the moving radio communication medium, and receives a response signal from the radio communication medium, comprising:

a plurality of antennas which are arranged side by side in a width direction crossing a moving direction of the moving radio communication medium and perform radio communication with the radio communication medium;

a detector which is provided on an upstream side of the antennas in the moving direction of the moving radio communication medium, and detects a passing position of the moving radio communication medium in the width direction; and a selector switch which selects, from the antennas, an antenna set in a position corresponding to the passing position based on passing position information of the radio communication medium obtained from the detector; and wherein the radio communication medium is moved in a state of being incorporated into paper, and the detector takes an image of a surface of the paper into which the radio communication medium is incorporated, compares the image with a dictionary image prepared in advance, and detects an incorporation position of the radio communication medium based on a result of the comparison.

3. A radio communication method which transmits communication data while supplying operating power to a moving radio communication medium by making an electromagnetic wave act on the moving radio communication medium through an antenna, and receives a response signal from the radio communication medium through the antenna, the method comprising:

detecting the moving radio communication medium by a detector which is provided on an upstream side of the antenna in a moving direction of the moving radio communication medium; and transmitting a radio communication signal to the radio communication medium when the radio communication medium comes to a setting position of the antenna, based on a medium detection signal obtained from the detector, wherein, the radio communication medium is moved in a state of being incorporated into paper and during the detecting of the radio communication medium, an image of a surface of the paper into which the radio communication medium is incorporated is taken and compared with a dictionary image prepared in advance, and an incorporation position of the radio communication medium is detected based on a result of the comparison.

* * * * *